US012415250B1

(12) United States Patent
Burres, Jr. et al.

(10) Patent No.: US 12,415,250 B1
(45) Date of Patent: Sep. 16, 2025

(54) CLAMP FOR WOODWORKING

(71) Applicants: Donald Eugene Burres, Jr., East Palatka, FL (US); Brendan Jude Bernhard, Sr., Palatka, FL (US)

(72) Inventors: Donald Eugene Burres, Jr., East Palatka, FL (US); Brendan Jude Bernhard, Sr., Palatka, FL (US)

( * ) Notice: Subject to any disclaimer, the term of this patent is extended or adjusted under 35 U.S.C. 154(b) by 0 days.

(21) Appl. No.: 19/070,023

(22) Filed: Mar. 4, 2025

(51) Int. Cl.
*B25B 5/00* (2006.01)
*B25B 5/14* (2006.01)

(52) U.S. Cl.
CPC .................................... *B25B 5/145* (2013.01)

(58) Field of Classification Search
CPC .............. B25B 5/145; B25B 5/00; B25B 5/14
See application file for complete search history.

(56) References Cited

U.S. PATENT DOCUMENTS 4,570,345 A 2/1986 Cattadoris
5,101,932 A * 4/1992 Trudgeon .............. E04D 12/008 269/902
5,280,891 A * 1/1994 Estes ....................... B23Q 3/105 269/902
5,673,898 A * 10/1997 Michalo ................. A62B 3/005 29/253
6,134,798 A * 10/2000 Duncan ................ G01B 5/0004 83/167
8,376,340 B2 2/2013 Sandmeier
9,114,547 B2 8/2015 Kinsler
10,435,948 B2 * 10/2019 Moreno .................... E06C 7/14

FOREIGN PATENT DOCUMENTS

CN 111633279 A 9/2020
EP 1580442 A2 9/2005

OTHER PUBLICATIONS

Bora, Parallel Clamp Blocks 4-Pack, Accessed Nov. 7, 2024.
Rockler, Rockler Parallel Clamp Blocks, 4-Pack, Accessed Nov. 7, 2024.
Norfolk Wood Shop, 4 pc. Clamp Blocks Set, Accessed Nov. 7, 2024.
Plafope, 4pcs Plywood Accessories Band Clamp Block for Woodworking Band Clamp Block Woodworking Band Clamps Block for Woodworking Ratchet Band Clamp Block Band Clamps Blocks Woodworking, Accessed Nov. 7, 2024.
TDS Online Stores, Multi Functional Anvil-Bench Block with V Slot, Accessed Nov. 7, 2024.

* cited by examiner

*Primary Examiner* — Lee D Wilson
(74) *Attorney, Agent, or Firm* — Lippes Mathias LLP; Mitchell Ghaneie; Josephine Chen

(57) ABSTRACT

The present invention provides a clamp for woodworking, The clamp comprises a body having a first end and an opposing second end, and a slot defined on the first end and comprising a plurality of graduated levels extending toward the second end. Each graduated level of the plurality of graduated levels comprises beveled edges.

20 Claims, 4 Drawing Sheets

CLAMP FOR WOODWORKING

FIELD OF THE DISCLOSURE

The present disclosure pertains to the field of art of clamps. More specifically, the disclosure pertains to a clamp for use in woodworking that facilitates holding of wood panels while cutting the wood panels with a saw.

PRIOR ART

Wood panels, such as plywood, are typically sold in standard large sheets that need to be resized to fit the specific dimensions an individual requires. Nevertheless, it may be challenging for an individual to cut wood panels solely with a saw operator.

For example, during the process of sawing a wood panel, an unsupported cut portion of the wood panel can deflect downwards relative to a remaining portion of the wood panel. As the cutting of the wood panel progresses, the deflection of the cut portion relative to the remainder of the wood panel can increase. As a result, the cut portion may easily break off and create rough, jagged edges on the wood panel.

Furthermore, a person cutting the wood panel may have a higher risk of encountering hazardous scenarios, such as a saw blade of the saw being bound up, causing a sudden kickback. Currently, to obtain accurate cutting, two people have to be present, one person holding the cut portion and the remaining portion together, and the other person operating the saw operator. However, this may increase labor costs and expenses for additional personnel.

Therefore, there is a need for a device to assist with woodworking that allows an individual to cut wood panels solely and effortlessly.

SUMMARY OF THE DISCLOSURE

The following is a concise summary of the disclosure presented herein with the primary aim of providing a preliminary understanding of certain aspects of the disclosure. It should be noted, however, that this summary is not intended to serve as a comprehensive overview of the disclosure, nor does it seek to identify or describe any critical or significant elements of the disclosure or the boundaries of its scope. Its sole purpose is to provide a rudimentary understanding of the disclosure's concepts and features, which will be expounded upon in greater detail in the ensuing sections.

In some embodiments, a clamp for woodworking comprises a body having a first end and an opposing second end; and a slot defined on the first end and comprising a plurality of graduated levels extending toward the second end.

In some embodiments, the clamp for woodworking comprises a body having a slot extending partially thereon. The slot comprises a plurality of graduated levels.

The present disclosure pertains to a clamp for use in woodworking designed to securely hold and perfectly align a cut portion and a remaining portion of a wood panel along a kerf during saw cutting, advantageously allowing an individual to cut the wood panel with precision and a smooth finish on edges of the wood panel. The securement of the clamp to the wood panel not only eliminates the dependency on an additional person during cutting of the wood panel, but also mitigates the risk of perilous circumstances, such as an occurrence of a saw's kickback force and handling splinters of the wood panel.

Furthermore, the disclosed clamp features a slot having a plurality of graduated levels that advantageously accommodate and secure wood panels with different thicknesses, thereby providing enhanced versatility and flexibility. Notably, each graduated level of the plurality of graduated levels may have beveled edges to facilitate the wood panel to slide to an appropriate graduated level. In addition, the beveled edges may minimize the risk of injury to a person and the risk of scratching or denting the wood panels, thereby bolstering safety and preventing damage to the wood panels. Moreover, the slot of the disclosed clamp has a symmetrical configuration that allows for simple manufacturing thereof, and provides elevated aesthetic appeal.

The above features and advantages will become apparent from the following detailed description taken with the accompanying drawings.

NUMBERING REFERENCE

1—Clamp
10—Body
10A—First Surface
10B—Second Surface
20—Slot
21—Graduated Levels
211—First graduated level
212—Second graduated level
213—Third graduated level
214—Fourth graduated level
215—Fifth graduated level
216—Sixth graduated level
220—Beveled Edges
101—Length
102—Width
103—Height
301—Exemplary User
302—Wood panel
302*a*—cut portion
302*b*—remaining portion

DETAILED DESCRIPTION OF THE DISCLOSURE

The following detailed description and accompanying drawings provide a comprehensive disclosure of an exemplary embodiment for the purpose of facilitating one of ordinary skill in the relevant art to make and use the disclosure. As such, the detailed description and illustration of the one or more exemplary embodiments presented herein are purely exemplary in nature and are not intended to limit the scope of the disclosure or its protection in any matter. It is further noted that the drawings may not be to scale, and in some cases, certain details may be omitted which are not necessary for an understanding of the present disclosure, such as conventional details of fabrication and assembly. Furthermore, there is no intention to be bound by any expressed or implied theory presented in the preceding technical field, background, brief summary or the following detailed description.

Figure 1:
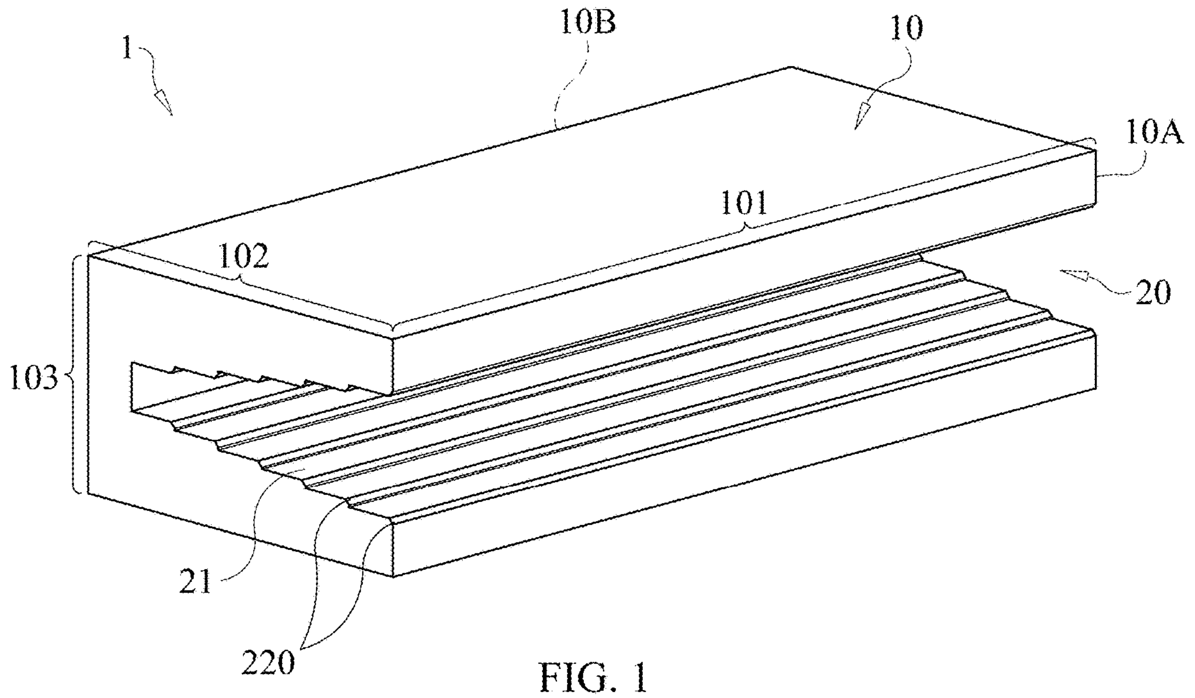
FIG. 1 illustrates a front perspective view of a non-limiting exemplary embodiment (the "exemplary embodiment") of a clamp for woodworking (the "clamp").

For purposes of description herein, the terms “left”, “right”, “front”, “top”, “bottom”, “side” and derivatives thereof shall relate to the device as oriented in FIG. 1. Furthermore, there is no intention to be bound by any expressed or implied theory presented in the preceding technical field, background, brief summary or the following detailed description.

Wood panels are versatile and widely used material in construction and crafting. To ensure an accurate cut of the wood panel, and to avoid the need for extra finishes, it is crucial to align a cut portion and a remaining portion of a wood panel during saw cutting while also avoiding potential drooping of the cut portion. The following discloses a clamp for use in woodworking designed to securely hold and perfectly align a cut portion and a remaining portion of a wood panel along a kerf during saw cutting.

A non-limiting, exemplary embodiment (herein after as the “exemplary embodiment”) of a clamp for woodworking 1 (herein after referred to as “the clamp”) is disclosed herein. The exemplary embodiment of the clamp 1 may not only secure the cut portion of the wood panel and the remaining portion of the wood panel but can also be used to accommodate a wide variety of wood panel sizes during saw cutting.

FIG. 1 illustrates a front view of the clamp 1 according to the exemplary embodiment. As shown in FIG. 1, the clamp 1 comprises a body 10 having a first end comprising a first surface 10A, an opposing second end comprising a second surface 10B, and an elongated slot 20 extending from the first surface 10A towards the second surface 10B. For example, the slot 20 is defined on the first surface 10A with a plurality of graduated levels 21 (six of which are shown in FIG. 1, although the slot 20 may have any suitable numbers of granulated levels 21). The plurality of granulated levels 21 extends towards the second surface 10B. As shown in FIG. 1, the plurality of granulated levels 21 progressively narrow toward the second surface 10B. The body 10, as shown in FIG. 1, has a substantially rectangular prism configuration comprising a length 101, a width 102, and a height 103, with a length-to-width-to-height ratio of 16 to 7 to 4, although any suitable shape and proportions is contemplated. The length 101 of the body 10 may range from 7.99 to 8.01 inches, the width 102 may range from 3.49 to 3.51 inches, and the height 103 may range from to 1.99 to 2.01 inches, although any dimensions is contemplated. The body 10 may be constructed of rigid materials including, but not limited to, plastic, metal and wood.

Figure 2:
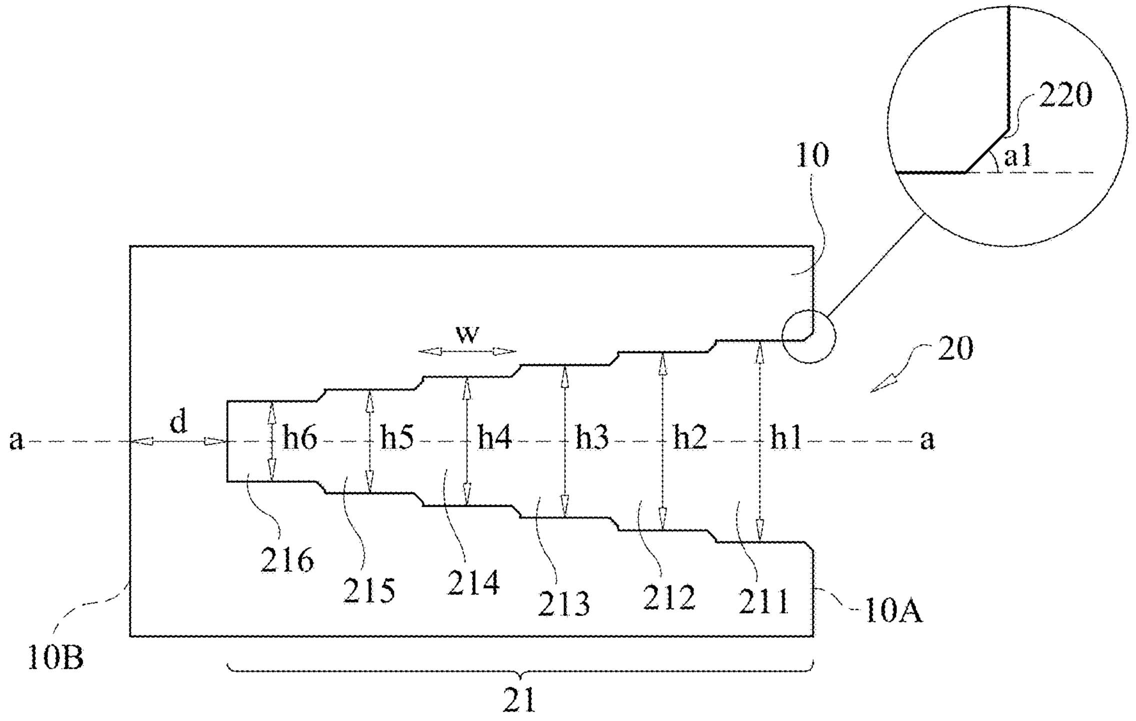
FIG. 2 illustrates a side view with a partially enlarged view of the clamp of FIG. 1.

With continuing reference to FIG. 1, FIG. 2 illustrates a side view of the clamp 1 of the clamp 1. As shown in FIG. 2, the slot 20 is symmetrical along a centroidal axis a-a of the body 10, although any suitable configuration is contemplated. The plurality of graduated levels 21 include a first graduated level 211, a second graduated level 212, a third graduated level 213, a fourth graduated level 214, a fifth graduated level 215, and a sixth graduated level 216 (although any suitable number of graduated levels are contemplated). Each of the granulated levels 211, 212, 213, 214, 215, 216 have descending heights from right to left as shown in FIG. 2. The descending heights between adjacent graduated levels 21 decrease incrementally. For example, the first graduated level 211 can have a first height h1 of 1.02 to 1.04 inches, the second graduated level 212 can have a second height h2 of 0.77 to 0.79 inch, the third graduated level 213 can have a third height h3 of 0.65 to 0.67 inch, the fourth graduated level 214 can have a fourth height h4 of 0.52 to 0.54 inch, the fifth graduated level 215 can have a fifth height 0.40 to 0.42 inch, and the sixth graduated level 216 can have a sixth height h6 of 0.27 to 0.29 inch, although any suitable dimensions are contemplated. Moreover, the plurality of graduated levels 21 may have an equal width w of 0.5 inch. The plurality of graduated levels 21 can also have a distance d from the second surface 10B of the body 10 to the slot 20, with the distance d being, for example, 0.5 inches. In some embodiments, a select graduated level 21 with a greater height relative to an adjacent graduated level 21 can accommodate a wood panel with a greater thickness, whereas a select graduated level 21 with a shorter height can hold a wood panel with a reduced thickness.

With continuing reference to FIGS. 1 and 2, each graduated level of the plurality of graduated levels 21 comprises beveled edges 220 having a predetermined angle a1 relative to an adjoining surface on which the clamp 1 rests. The predetermined angle a1 of the beveled edges 220 is preferably 45 degrees, as shown in FIG. 2, or may range from 30 degrees to 60 degrees, although any suitable angle is contemplated. Furthermore, each of the beveled edges 220 may have a length of 0.0615 to 0.0635 inch. It is also anticipated that the beveled edges 220 may be curved or round edges to enhance safety and prevent damage of the wood panels.

Figure 3:
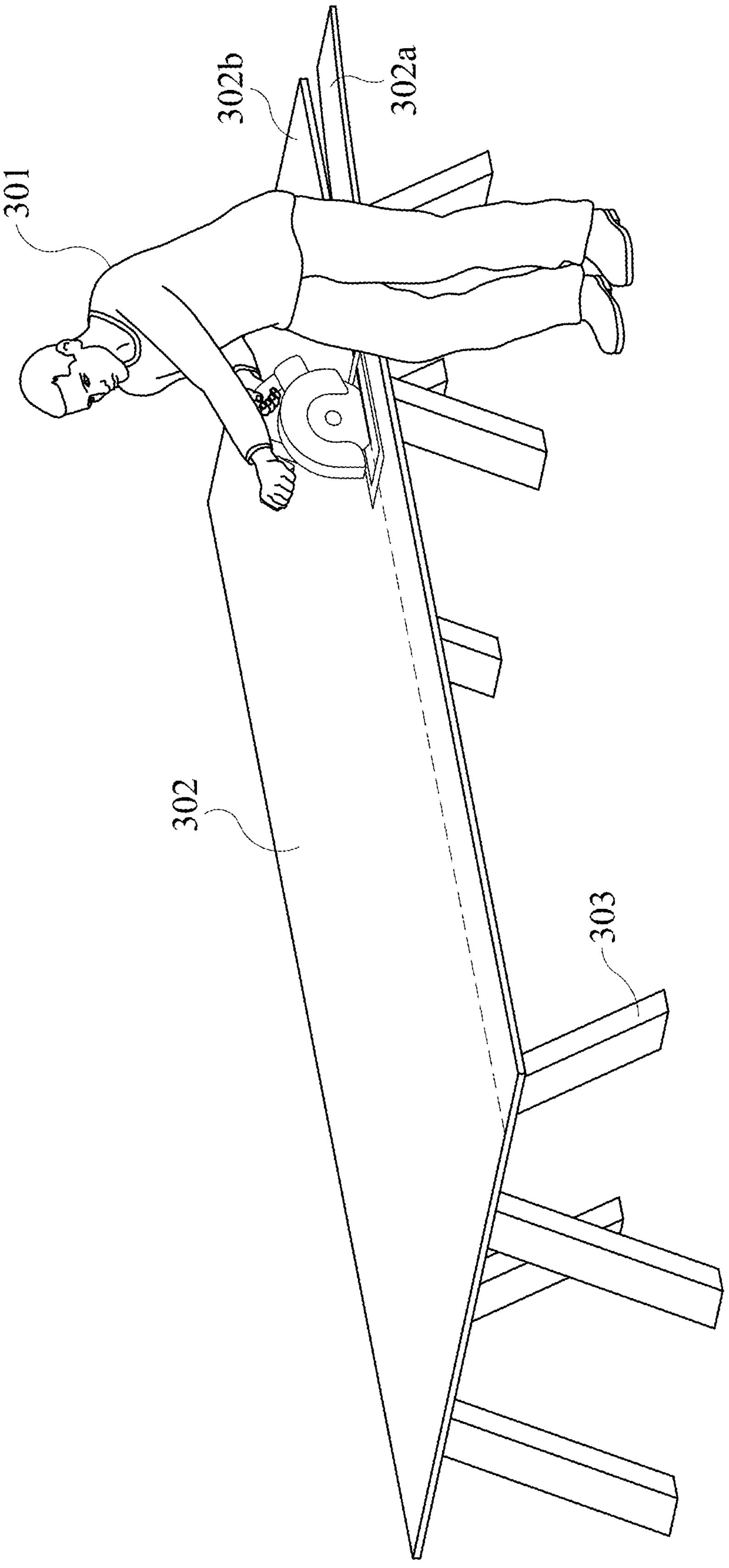
FIG. 3 illustrates a first in-use view of the clamp of FIG. 1.
Figure 4:
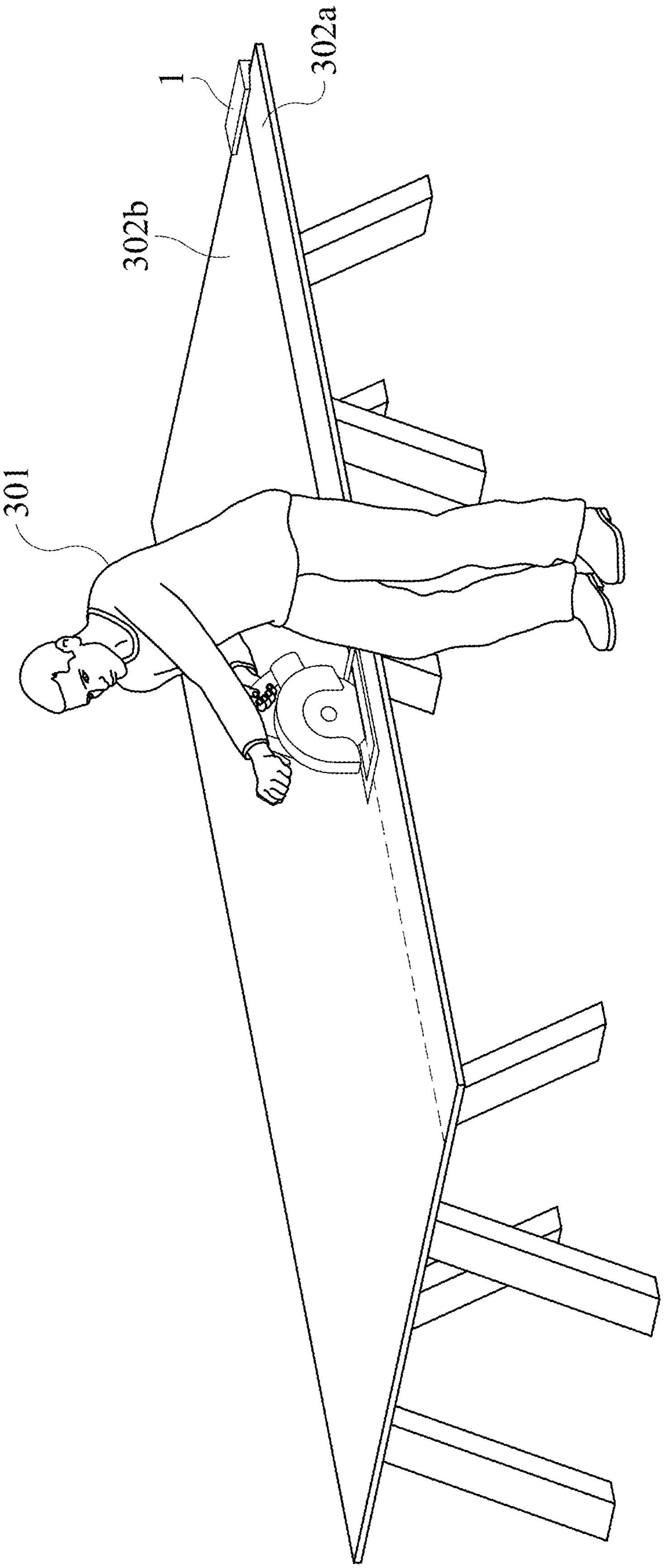
FIG. 4 illustrates a second in-use view of the clamp of FIG. 1.
Figure 5:
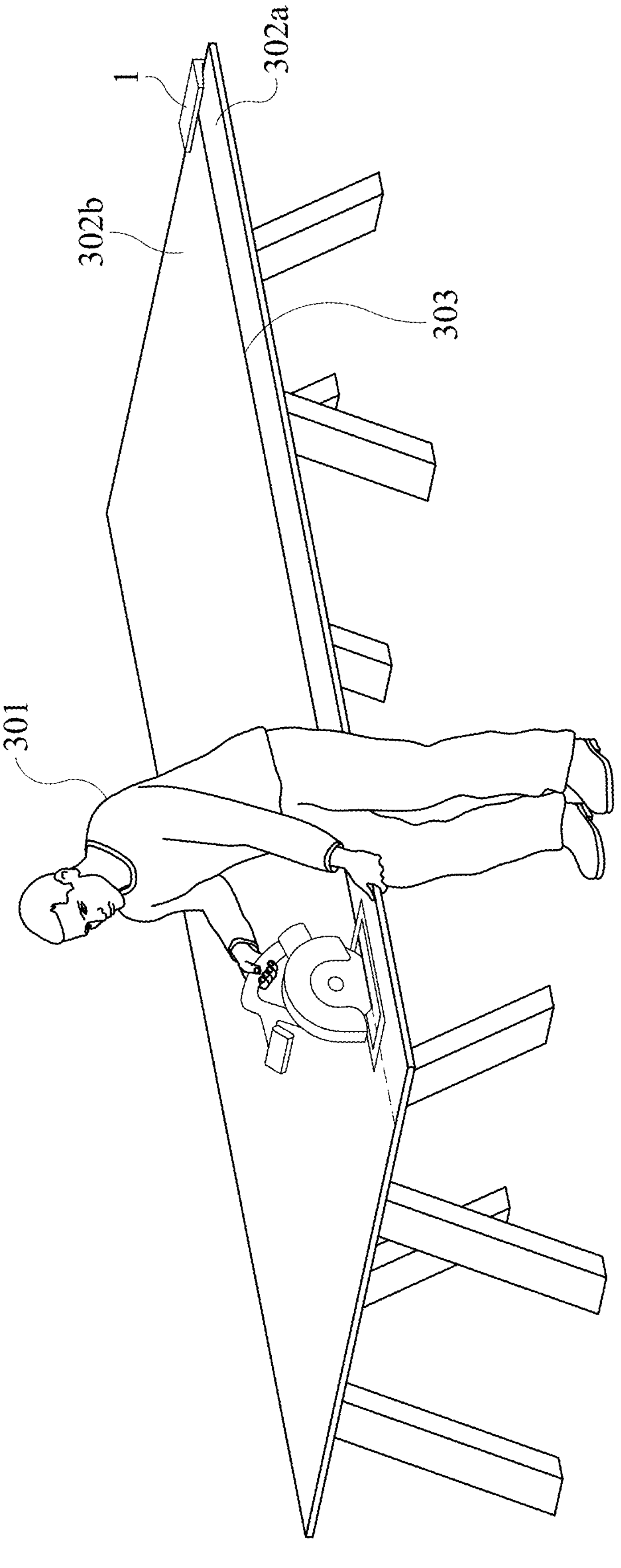
FIG. 5 illustrates a third in-use view of the clamp of FIG. 1.

Referring to FIGS. 3 to 5, an exemplary method of using the clamp 1 in woodworking is presented herein to further demonstrate the convenience and advantages of the clamp 1. It is anticipated that several steps may be sequentially interchangeable and equivalent application of one or more permutations of such sequentially interchangeable steps does not alter the spirit of the disclosure in any meaningful way.

As shown in FIG. 3, a wood panel 302, such as plywood, is positioned on a worktable or sawhorse 303, and an exemplary user 301 initiates the saw cutting process by sawing a part of the wood panel 302 and dividing the wood panel 302 into a cut portion 302*a* and a remaining portion 302*b*. During a typical saw cutting processes, the cut portion 302*a* tends to droop downwards relative to the remaining portion 302*b* of the wood panel 302, as shown in FIG. 3.

Next, as shown in FIG. 4, the exemplary user 301 may effortlessly place and move the slot 20 of the clamp 1 towards the cut and remaining portions 302*a*, 302*b* to eliminate the droop. To do so, the exemplary user 301 positions the clamp 10 adjacent to the cut and remaining portions 302*a*, 302*b*, and moves the clamp 10 towards the cut and remaining portions 302*a*, 302*b* until the cut and remaining portions 302*a*, 302*b* engage at least one of the beveled edges 220 and continues moving until engaging one of graduated levels 21 in the slot 20 having a width equal to that of the cut and remaining portions 302*a*, 302*b* with a friction fit. The clamp 10 then engages the cut and remaining portions 302*a*, 302*b* with the friction fit to secure the clamp 10 to the cut and remaining portions 302*a*, 302*b*. The beveled edges 220 of the engaged graduated level 21, engaged with the cut portion 302*a* and the remaining portion 302*b*, to become aligned and stationary relative to each other. As a result, the appropriate graduated level 21 holds the cut portion 302*a* and the remaining portion 302*b* together to align the cut portion 302*a* and the remaining portion 302*b*, advantageously substantially maintaining the cut line for the exemplary user 301 while also preventing kickback of the saw. The exemplary user 301 may then continue the saw cutting process.

As shown in FIG. 5, with the clamp 1 holding the cut and remaining portions 302*a*, 302*b* in place, the exemplary user 301 can make a straight and clean kerf for the wood panel 302 effortlessly.

The disclosed clamp 1 not only offers a convenient and safe solution for wood working, but also advantageously provides versatility for accommodating wood panels with a wide range of thicknesses.

While the embodiments of the disclosure have been disclosed, certain modifications may be made by those skilled in the art to modify the disclosure without departing from the spirit of the disclosure.

What is claimed is:

1. A clamp for woodworking, the clamp comprising:

a body having a first end and an opposing second end; and a slot defined on the first end and comprising a plurality of graduated levels extending toward the second end;

wherein the plurality of graduated levels comprises a first graduated level having a height of 1.02 to 1.04 inches, a second graduated level having a height of 0.77 to 0.79 inch, a third graduated level having a height of 0.65 to 0.67 inch, a fourth graduated level having a height of 0.52 to 0.54 inch, a fifth graduated level having a height of 0.40 to 0.42 inch, and a sixth graduated level having a height of 0.27 to 0.29 inch.

2. The clamp of claim 1, wherein the body has a substantially rectangular prism configuration.

3. The clamp of claim 2, wherein the rectangular prism configuration has a length-to-width-to height ratio of 16 to 7 to 4.

4. The clamp of claim 2, wherein the body has a length 7.99 to 8.01 inches; a width of 3.49 to 3.51 inches; and a height of 1.99 to 2.01 inches.

5. The clamp of claim 1, wherein the slot is symmetrical along a centroidal axis of the body.

6. The clamp of claim 1, wherein each graduated level of the plurality of graduated levels has an equal width.

7. The clamp of claim 6, wherein the equal width is 0.5 inch.

8. The clamp of claim 1, wherein each graduated level of the plurality of graduated levels comprises beveled edges.

9. The clamp of claim 8, wherein each of the beveled edges forms a 45-degree angle relative to an associated adjoining surface on which the body rests.

10. The clamp of claim 8, wherein a length of each of the beveled edges is 0.0615 to 0.0635 inch.

11. The clamp of claim 1, wherein a distance from the second end to the slot is 0.5 inch.

12. A clamp for woodworking, the clamp comprising:

a body having a slot extending partially thereon; and wherein the slot comprises a plurality of graduated levels;

wherein the plurality of graduated levels comprises a first graduated level having a height of 1.02 to 1.04 inches, a second graduated level having a height of 0.77 to 0.79 inch, a third graduated level having a height of 0.65 to 0.67 inch, a fourth graduated level having a height of 0.52 to 0.54 inch, a fifth graduated level having a height of 0.40 to 0.42 inch, and a sixth graduated level having a height of 0.27 to 0.29 inch.

13. The clamp of claim 12, wherein each graduated level of the plurality of graduated levels comprises beveled edges.

14. The clamp of claim 13, wherein each of the beveled edges forms a 45-degree angle relative to an associated adjoining surface on which the body rests.

15. The clamp of claim 14, wherein the slot is symmetrical along a centroidal axis of the body.

16. The clamp of claim 12, wherein the body has a substantially rectangular prism configuration.

17. The clamp of claim 16, wherein the rectangular prism configuration has a length-to-width-to height ratio of 16 to 7 to 4.

18. The clamp of claim 12, wherein each graduated level of the plurality of graduated levels has an equal width of 0.5 inch.

19. A clamp for woodworking, the clamp comprising:

a body having a first end and an opposing second end; and wherein the slot comprises a plurality of graduated levels;

wherein the body has a substantially rectangular prism configuration having a length 7.99 to 8.01 inches; a width of 3.49 to 3.51 inches; and a height of 1.99 to 2.01 inches; and a slot defined on the first end and comprising a plurality of graduated levels extending toward the second end.

20. The clamp of claim 19, wherein the plurality of graduated levels comprises six graduated levels.

* * * * *